US 8,892,422 B1
Nov. 18, 2014

(12) United States Patent
Kumar

(10) Patent No.: US 8,892,422 B1
(45) Date of Patent: Nov. 18, 2014

(54) PHRASE IDENTIFICATION IN A SEQUENCE OF WORDS

(75) Inventor: Shailesh Kumar, Hyderabad (IN)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/544,323

(22) Filed: Jul. 9, 2012

(51) Int. Cl.
G06F 17/27 (2006.01)
G06F 17/20 (2006.01)
G06F 17/21 (2006.01)

(52) U.S. Cl.
USPC .................................. 704/9; 704/1; 704/10

(58) Field of Classification Search
USPC .................................................. 704/1, 9, 10
See application file for complete search history.

(56) References Cited

U.S. PATENT DOCUMENTS

| 5,696,962 | A | * | 12/1997 | Kupiec .................................. 1/1 |
| 7,567,959 | B2 | | 7/2009 | Patterson |
| 7,603,345 | B2 | | 10/2009 | Patterson |
| 7,693,813 | B1 | | 4/2010 | Cao et al. |
| 8,117,223 | B2 | | 2/2012 | Patterson |
| 8,166,045 | B1 | | 4/2012 | Mazumdar et al. |
| 8,176,067 | B1 | * | 5/2012 | Ahmad et al. .................. 707/765 |
| 8,402,033 | B1 | | 3/2013 | Mazumdar et al. |
| 8,521,745 | B2 | * | 8/2013 | Probst et al. .................... 707/739 |
| 2002/0116170 | A1 | * | 8/2002 | Corman et al. .................... 704/1 |
| 2004/0249637 | A1 | * | 12/2004 | Baker ............................ 704/239 |
| 2007/0100680 | A1 | * | 5/2007 | Kumar et al. ..................... 705/10 |
| 2011/0295903 | A1 | * | 12/2011 | Chen ............................. 707/794 |

* cited by examiner

Primary Examiner — Jesse Pullias
(74) Attorney, Agent, or Firm — Middleton Reutlinger

(57) ABSTRACT

Methods and apparatus related to phrase identification. Methods are provided for determining co-occurrence consistencies for positional word pairings of a plurality of sequences of words in a corpus that may be utilized in identifying a phrase; determining a phrase coherence of a sequence of words based on the co-occurrence consistencies for positional word pairings in the sequence of words; and determining one or more phrase boundaries in a sequence of words.

25 Claims, 8 Drawing Sheets

PHRASE IDENTIFICATION IN A SEQUENCE OF WORDS

BACKGROUND

This specification is directed generally to text mining. Text mining involves the processing of text data to make the text data suitable for one or more applications such as, for example, text classification, text clustering, information retrieval, and/or key phrase detection. Text mining attempts to represent unstructured text data in a structured format that can be processed meaningfully for one or more text mining applications.

One text representation is called the "Bag-of-Words" model or the "Vector Space" model. In the Bag-of-Words model and other models it may be desirable to identify phrases in one or more text mining applications in addition to or as an alternative to identifying individual words. Examples of identifying phrases include the use of n-gram based language models that compute raw statistics of total counts of all n-grams of sizes n=1, 2, . . . , N and convert the computed raw statistics into probabilities.

SUMMARY

The present disclosure is directed to methods and apparatus for phrase identification. For example, some implementations are directed to methods and apparatus for determining co-occurrence consistencies for positional word pairings of a plurality of sequences of words in a corpus that may be utilized in identifying a phrase. Also, for example, some implementations are directed to inventive methods and apparatus for determining a phrase coherence of a sequence of words based on the co-occurrence consistencies for positional word pairings in the sequence of words. Also, for example, some implementations are directed to inventive methods and apparatus for determining one or more phrase boundaries in a sequence of words.

In some implementations a computer implemented method of identifying a phrase weighting of a sequence of words as a function of the position of words present in the sequence of words is described that includes the steps of: identifying a sequence of words; determining, utilizing one or more processors, a centrality value for each of a plurality of identified words in the sequence of words, the centrality value for each of the identified words based on a co-occurrence consistency with other of the identified words in their respective relative positions in the sequence of words; and determining, utilizing one or more processors, a phrase weighting of the sequence of words based on the determined centrality value for each of the identified words, wherein the phrase weighting provides an indication of the likelihood that the sequence of words is a phrase.

This method and other implementations of technology disclosed herein may each optionally include one or more of the following features.

The step of determining the phrase weighting of the sequence of words may include combining the centrality value for each of the identified words.

The step of determining the phrase weighting of the sequence of words may include determining a weighted average of the centrality value for each of the identified words.

The step of determining the phrase weighting of the sequence of words may include determining a minimum centrality value from the centrality value for each of the identified words.

The method may further include identifying the sequence of words for indexing as a phrase when the phrase weighting is greater than a threshold phrase weighting.

The step of determining a centrality value for each of the identified words may include performing an auto-associative analysis for each of the identified words with all other of the identified words in their respective relative positions in the sequence of words.

The step of determining a centrality value for each of the identified words may include performing a link analysis for each of the identified words with all other of the identified words in their respective relative positions in the sequence of words.

The co-occurrence consistency for each of the identified words with other of the identified words in their respective relative positions in the sequence of words may be extracted from a plurality of positional matrices, each of the positional matrices containing co-occurrence consistency values for a plurality of word pairs in a given positional relation to one another.

The co-occurrence consistency for each of the identified words with other of the identified words in their respective relative positions in the sequence of words may factor in how much more likely than incidental it is for each of the identified words to co-occur with other identified words in their respective relative positions.

The method may further include parsing a document to create the sequence of words.

The method may further include receiving a search query and identifying the sequence of words from the search query.

The sequence of words may be part of a larger sequence of words and the method may further include: identifying a second sequence of words from the larger sequence of words, wherein the second sequence of words contains the same words as the identified words and one additional word; determining, utilizing one or more processors, an additional centrality value for the additional word, the additional centrality value based on the co-occurrence consistency of the additional word with other of the identified words in their respective relative positions in the second sequence of words; and determining, utilizing one or more processors, a second phrase weighting of the second sequence of words based on the determined additional centrality value, wherein the second phrase weighting provides an indication of the likelihood that the second sequence of words is a phrase; and comparing the phrase weighting to the second phrase weighting to identify which is more likely to be a phrase.

The sequence of words may be part of a larger sequence of words and the method may further include: identifying additional sequences of words from the larger sequence of words; and determining, utilizing one or more processors, additional phrase weightings of each of the additional sequences of words that provide an indication of phrase likelihood.

The method may further include comparing a plurality of the additional phrase weightings and the phrase weighting to one another to identify at least one phrase in the larger sequence of words. The comparing may include identifying at least one local extrema among the additional phrase weightings and the phrase weighting.

In some implementations a computer implemented method of identifying phrases in a document collection is provided and includes the steps of: identifying positional bigrams for words in a corpus, where a positional bigram is the occurrence of a first word in a document in the corpus located k-positions before a second word in the document, where positional bigrams are generated for each value k where k=1, 2, . . . n, and n is an integer; determining a count of the number of instances each positional bigram occurs in the document collection; determining a co-occurrence probability for each positional bigram based on the positional bigram counts, where the co-occurrence probability is a measure of the probability each positional bigram occurs in the corpus; determining a co-occurrence consistency for each positional bigram based on the co-occurrence probability for each positional bigram; where the co-occurrence consistency is a measure of how much greater the co-occurrence probability factor is than an incidental chance the positional bigram occurs; and storing the co-occurrence consistency for each identified positional bigram in the document collection.

This method and other implementations of technology disclosed herein may each optionally include one or more of the following features.

The method may further include identifying one or more sequences of words including an ordered set of words from the document collection; determining a centrality value for each of a plurality of words in each of the sequences of words based on the co-occurrence consistency determined for each positional bigram, where each centrality value is a measure of how important one of the words is in the sequence of words; and/or determining a phrase weighting for each of the one or more sequences of words based on the centrality value. The step of determining the phrase weighting for the one or more sequences of words may optionally include combining the centrality value of all words in the sequence of words to compute the phrase weighting for the sequence of words. The step of determining the phrase weighting may optionally include combining the centrality value for the words in the sequence of words by calculating a weighted average of the centrality values for the words and/or determining the minimum of the centrality values for the words.

The method may further include parsing a document to identify one or more sequences of words and assigning phrase weightings to the sequences of words. The method may optionally further include selecting one or more of the sequences of words for indexing the document based on the phrase weightings assigned to the sequences of words. In some implementations the step of selecting one or more of the sequences of words for indexing may include selecting one or more of the sequences of words that have corresponding phrase weightings greater than a predefined value.

In some embodiments the method further includes omitting certain positional bigrams from one or more steps when the certain positional bigrams have less than a predefined value of a count, a co-occurrence probability, and/or co-occurrence consistency.

In some embodiments the step of determining the count of the number of instances each positional bigram occurs in the document collection includes:

determining a co-occurrence count $\eta_k (v_\alpha, v_\beta)$ for each positional bigram occurring in the document collection, where the co-occurrence count is how many times word $v_\alpha$ occurs k positions before word $v_\beta$ for all relative positions k=1, 2, ... n, where n is an integer;

determining a from-margin count $\eta_k (v_\alpha, \bullet)$ for each word $v_\alpha$, where the from-margin count is how many times the word $v_\alpha$ occurs k positions before any word in the corpus;

determining a to-margin count $\eta_k (\bullet, v_\beta)$ for each word $v_\beta$, where the to-margin count is how many times any word occurs k positions before the word $v_\beta$ in the corpus; and determining a total co-occurrence count $\eta_k (\bullet, \bullet)$, where the total co-occurrence count is how many times any word occurs k positions before any other word in the corpus.

In some embodiments the step of generating a co-occurrence probability for each positional bigram based on the positional bigram counts includes:

determining positional co-occurrence probabilities for each positional bigram based on the co-occurrence count and the total co-occurrence count;

determining from-margin probabilities for each positional bigram based on the from-margin count and the total co-occurrence count for each word $v_\alpha$; and determining to-margin probabilities for each positional bigram based on the to-margin count and the total co-occurrence count for each word $v_\beta$.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process a sequence of words to identify at least one phrase in the sequence of words for utilization in one or more meaningful text mining applications. These identified phrases are derived from analysis of multiple words of the word grouping and the word pairing positions of words in the word grouping. The identified phrases may be utilized by one or more text mining applications to provide improved performance of the text mining applications. Particular implementations of the subject matter described herein process words in a plurality of sequences of words to determine co-occurrence consistencies for the positional words pairings in the sequence of words for utilization in identifying phrases. The determined co-occurrence consistencies represent new values that are derived from analysis of those words and their position in the sequence of words.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
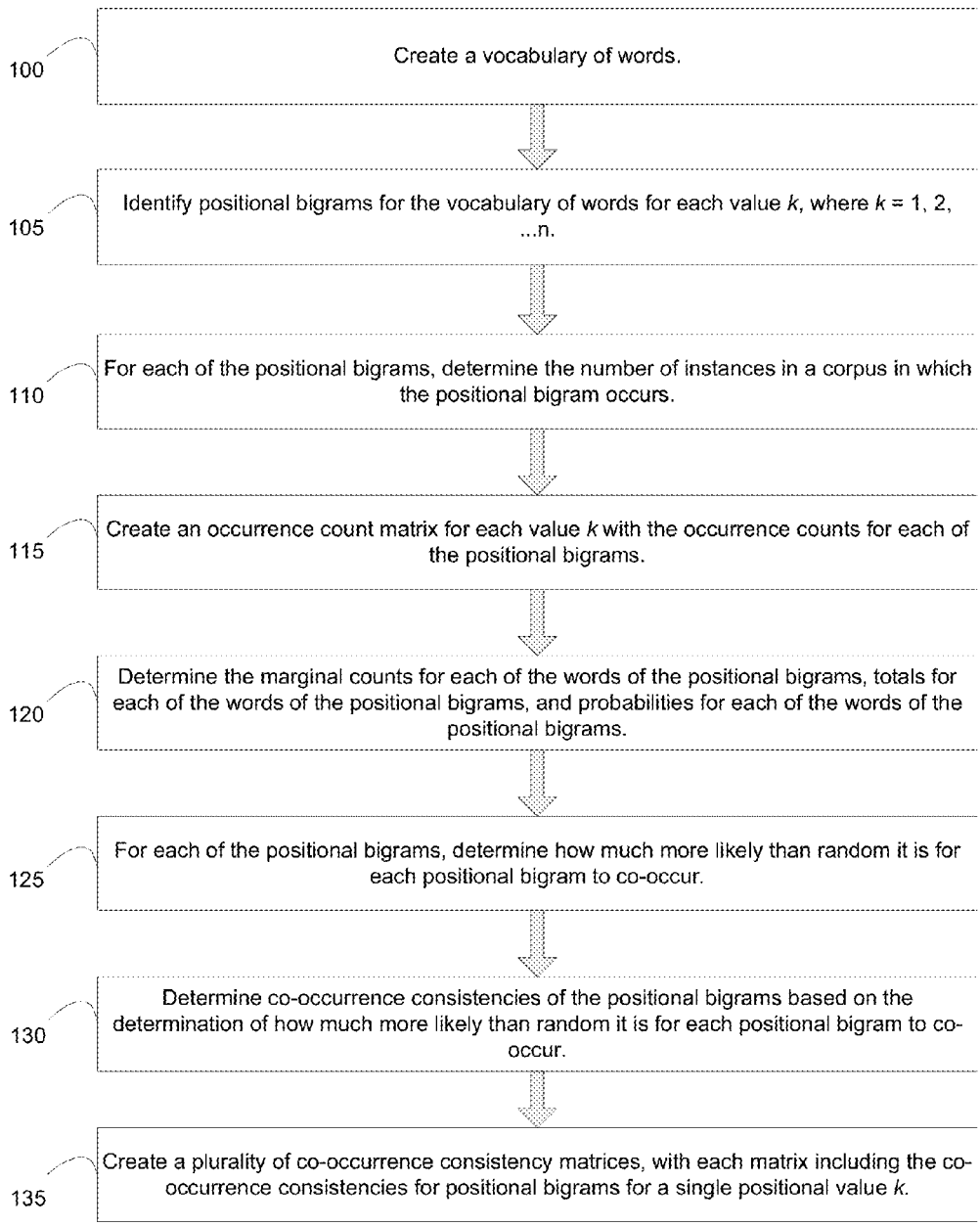
FIG. 1 is a flow chart illustrating an implementation of a method of determining co-occurrence relationships between words in their respective relative positions in a corpus of word groupings.

Referring to FIG. 1, a flow chart illustrating an implementation of a method of determining co-occurrence relationships between words in their respective relative positions in a corpus of word groupings is provided. A corpus of word groupings is a set of electronically stored word groupings from one or more sources that are analyzed to determine one or more characteristics of the words of the word groupings. For example, the corpus of word groupings described herein may be utilized to determine co-occurrence consistencies for positional word pairings of a plurality of sequences of words in the corpus that may be utilized in identifying a phrase. Other implementations may perform the steps in a different order, omit certain steps, and/or perform different and/or additional steps than those illustrated in FIG. 1. For convenience, aspects of FIG. 1 will be described with reference to a system of one or more computers that perform the process. The system may be, for example, the co-occurrence relationship determination engine 910 of FIG. 9.

Figure 9:
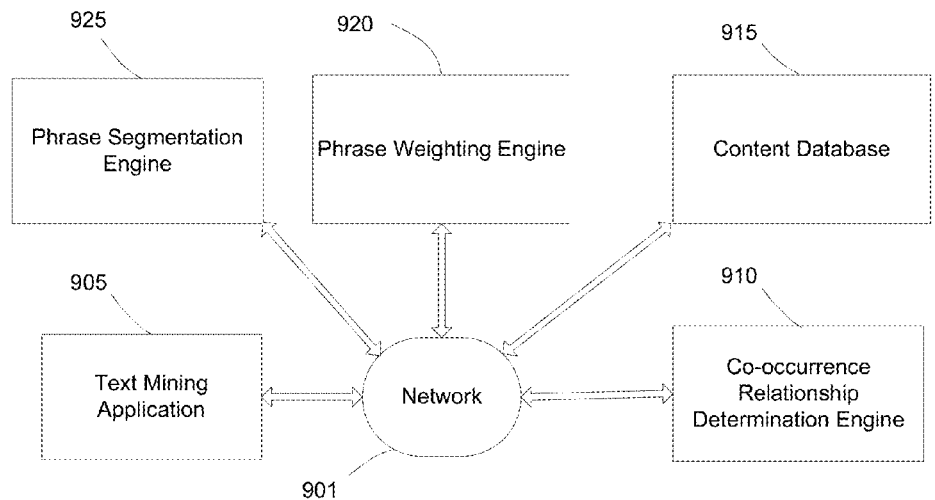
FIG. 9 is a block diagram of an example environment in which co-occurrence consistencies for positional word pairings in a sequence of words may be determined, phrase coherence of a sequence of words may be determined as a function of positional word pairings in the sequence of words, and/or one or more phrase boundaries in a sequence of words may be determined.

At step 100 a vocabulary of words is created. In some implementations the vocabulary of words may be obtained from the content database 915 (FIG. 9). For example, the content database 915 may include one or more storage mediums having one or more documents and unique words from the documents may be utilized to form the vocabulary of words. The documents may optionally include all of those word groupings of the corpus of step 110. For example, in some implementations the content database 915 may include a plurality of word groupings of one or more tags for media (e.g., videos, images, sounds), all the unique words of the tags may form the vocabulary of words, and the plurality of word groupings may form the corpus. Also, for example, in some implementations the content database 915 may include a plurality of documents each having a plurality of words, the unique words may form the vocabulary of words, and the plurality of documents may form the corpus. Each of the documents may include all or portions of one or more documents such as, for example, HTML documents, PDF documents, DOC documents, query documents, keyword documents, and/or media tag documents. For example, in some implementations one document may include a portion of another document such as, for example, tags of an HTML document. Also, for example, in some implementations a document may include portions of a plurality of documents such as, for example, portions of the titles of a plurality of PDF documents and DOC documents. One or more canonicalization rules may optionally be applied to words from the documents to modify and/or omit certain words. For example, stemming of words, phrasing of words, removal of low frequency words, removal of numerical values, and/or removal of stop words may be utilized. Also, for example, in some implementations the vocabulary of key words may be derived from one or more preexisting listings of words. For example, a preexisting listing of words that includes a plurality of words from a language that have optionally been modified utilizing canonicalization rules may be utilized.

Figure 2:
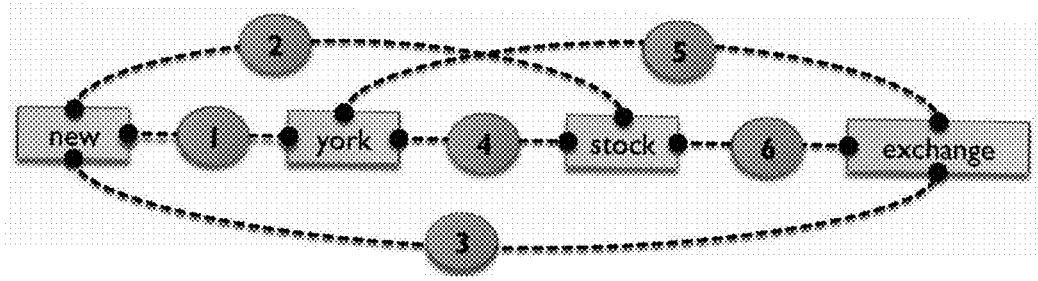
FIG. 2 illustrates an example of a sequence of words and positional bigrams of the sequence of words.

At step 105 a plurality of positional bigrams for the vocabulary of words are identified for each value k, where k=1, 2, ... n. A positional bigram is a co-occurrence of a pair of words in a specific relative position with respect to each other. For example, with reference to FIG. 2, an example of a text segment and positional bigrams of the text segment are illustrated. A text segment may include any sequence of words with no breaking punctuation. For example, the text "in trading today, the new york stock exchange" may include two text segments: "in trading today" and "the new york stock exchange." FIG. 2 illustrates the text segment "new york stock exchange." Positional bigram 1 of FIG. 2 is for the word pair "new" and "york," with "new" occurring one position prior to "york." Positional bigram 2 is for the word pair "new" and "stock," with "new" occurring two positions prior to "stock." Positional bigram 3 is for the word pair "new" and "exchange," with "new" occurring three positions prior to "exchange." Positional bigram 4 is for the word pair "york" and "stock," with "york" occurring one position prior to "stock." Positional bigram 5 is for the word pair "york" and "exchange," with "york" occurring two positions prior to "exchange." Positional bigram 6 is for the word pair "stock" and "exchange," with "stock" occurring one position prior to "exchange."

In some implementations one or more words in a sequence of words may be replaced with a generic placeholder. In some implementations a positional bigram may optionally formed with such a placeholder. For example, the number "4" in the phrase "new york stock exchange rose 4 points" may be replaced with a placeholder such as "#." Also, for example, the percentage "0.25%" in the phrase "new york stock exchange rose 0.25%" may be replaced with a placeholder such as "%." In some implementations positional bigrams may optionally be formed that include such a placeholder as one of the word pairs. In some implementations positional bigrams may not be formed for such a placeholder.

In some implementations the co-occurrence relationship determination engine 910 may identify positional bigrams for each value k from the vocabulary of words that occur at least once in any of the text segments of the corpus of step 110. In some implementations the co-occurrence relationship determination engine 910 may identify positional bigrams for each value k from the vocabulary of words that occur with at least a threshold frequency in any of the text segments of the corpus of step 110. In some implementations all possible positional bigrams for each value k for words from the vocabulary of words may be identified as positional bigrams.

At step 110, for each of the identified positional bigrams, the number of instances in a corpus in which the positional bigram occurs is determined. For example, the co-occurrence relationship determination engine 910 may identify the number of sequences of words in a corpus in which both words in the positional bigram co-occur in the relative position k of the positional bigram. In some implementations the co-occurrence relationship determination engine 910 may identify the number of text segments in a corpus in which both words in the positional bigram co-occur in the relative position k of the positional bigram. In some implementations a segment parser may be utilized to parse each of a plurality of documents of the corpus into its one or more fields; parse each field into its one or more sentences; and/or parse each sentence into its one or more text segments. Optionally, only the number of instances in which the positional bigram occurs within individual text segments in the corpus is determined.

The analyzed sequences of words of the corpus may include any sequence of words for which it may be desirable to perform text mining to rank words in the sequence of words. For example, one or more of the sequence of words of the corpus may include: a plurality of tags for media such as, for example, images, videos, and/or sounds; a multi-word query such as, for example, a search engine query; adwords such as, for example, a set of keywords associated with an advertisement; a plurality of words from a field in a document such as, for example, a set of keywords in a title, URL, and/or anchor; a plurality of words of a document such as, for example, all or a set of words in an entire document; and/or a plurality of keywords such as, for example, a set of explicitly annotated keywords in a document such as, for example, named entities in a news story, MeSH terms in Medline data, and/or keywords in a scientific publication. As discussed herein, such sequences of words may optionally be parsed into text segments and only positional bigrams within each of the text segments may be counted. One of ordinary skill in the art, having had the benefit of the present disclosure, will recognize and appreciate that the methods and apparatus described herein may be applied to one or more of a variety of sequences of words.

The sequences of words from the corpus may be represented by the equation: $S=\{<w_m, x^m=[x_1^m, x_2^m, x_{L_m}^m]>\}_{m=1}^M$ where M is the number of sequences of words in the corpus; where $x^m=[x_1^m, x_2^m, x_{L_m}^m]$=the $m^{th}$ sequence of words of length $L_m$; where $w_m$=the weight of the $m^{th}$ sequence of words; and $x_l^m$=the weight of the $l^{th}$ word in the $m^{th}$ sequence of words. In some implementations the weight of the $m^{th}$ sequence of words ($w_m$) may depend on the relative importance of the field, f, in which the sequence of words occurs (e.g., title may be more important than the header and/or the header may be more important than the body) and/or the number of occurrences of the sequence of words in the field in the corpus. For example, in some implementations $w_m$ may be represented by the equation $$w_m = \sum_{fields:f} \theta_f \times freq(x_m | f)$$

wherein $\theta_f$ is the relative importance of the field in which the sequence of words occurs and $freq(x_m|f)$ is the number of occurrences of the sequence of words in the corpus. In some implementations the weight of the $m^{th}$ sequence of words ($w_m$) may additional and/or alternatively depend on the weight of the document from which the sequence of words is obtained.

In some implementations an un-weighted count of the number of instances in a corpus in which the positional bigram occurs is determined. For example, in some implementations an un-weighted count of the number of text segments in a corpus in which the positional bigram occurs is determined. For example, if the first word of a word pair is "new," the second word of the word pair is "eve," and the relative position between the two words is two, a count of the number of word groupings in the corpus in which "new" occurs two positions prior to "eve" will be determined. This may be done for each of the identified positional bigrams in the corpus.

In some implementations a weighted count of the number of instances in a corpus in which the positional bigram occurs is determined. The weighted count still determines the number of instances in a corpus in which the positional bigram occurs, but also takes into account the weight of the sequence of words in each of the sequences of words in which the positional bigram occurs. For example, the weighted count of the number of instances in a corpus in which the positional bigram occurs may take into account one or more independence based presumptions such as property weighting (e.g., how often the sequence of words occurs in the word grouping, how early the sequence of words occurs in the document, decorations applied to the sequence of words (bold, italics, font, etc.)), and/or field weighting (e.g., does the sequence of words occur in an important field such as the title). For example, positional bigrams that occur in the title of a document in the corpus may be given more weight than positional bigrams that occur in the body of a document in the corpus.

In some implementations at least some of the weights for the sequence of words may be provided. For example, a weight may be provided in combination with each of the sequences of words. Also, for example, a weight may be provided in combination with each of the documents containing the sequences of words. In some implementations at least some of the weights may additionally or alternatively be determined via analysis of the sequences of words in the corpus. For example, the co-occurrence relationship determination engine 910 may determine the weights via analysis of the sequences of words. Optionally, if weights are not provided and/or determined for one or more of the sequences of words a default weight (e.g., 1) may be assigned to such sequences of words.

In some implementations a weighted count of the number of instances in a corpus in which a word ($v_\alpha$) occurs k positions before another word ($v_\beta$) for all pairs of words ($v_\alpha$, $v_\beta$) and for all relative positions k=1, 2, ..., n is determined using the following equation:

$$\eta_k(v_\alpha, v_\beta) = \Sigma_{m=1}^M w_m \Sigma_{i=1}^{L_m-k} \delta(x_i^m = v_\alpha) \delta(x_{i+k}^m = v_\beta).$$

A co-occurrence count matrix for each value k may optionally be formed in step 115 that identifies the number (either weighted or un-weighted) of sequences of words in the corpus in which the bigram occurs for a position k. For example, four separate co-occurrence count matrices may be created for counts of a plurality of bigrams for positions 1, 2, 3, and 4. In some implementations the co-occurrence relationship determination engine 910 may form each co-occurrence count matrix in step 115. In some implementations pruning of certain bigrams from the co-occurrence counts of the number of bigrams for a value k may occur. For example, in implementations in which a co-occurrence count matrix is created, at least data associated with those bigrams that occur in less than a threshold number of sequences of words for a position k may be removed from the co-occurrence count matrix for that position k. For example, for a bigram of the words "new" and "york" the bigram may occur with sufficient frequency for a position "1" but may not occur with sufficient frequency for position "4" and that bigram may be pruned from the co-occurrence count matrix for position "4." In some implementations the threshold number may be a set number (e.g., 20). In some implementations the threshold number may be statistically determined (e.g., statistical outliers or a set deviation below a statistical mean or medium). One of ordinary skill in the art, having had the benefit of the present disclosure, will recognize and appreciate that one or more additional and/or alternative bases may optionally be utilized for pruning certain positional bigrams that occur with relatively low frequency.

In some implementations existing co-occurrence count matrices may optionally be modified. For example, as a corpus of sequences of words grows and adds new sequences of words, it may be desirable to update the co-occurrence count matrices with data from the new sequences of words. In some implementations, to update the co-occurrence count matrices for each of a plurality of positional bigrams in the new sequences of words, the number of sequences of words in the new grouping in which the positional bigrams are present may be determined (e.g., as described, for example, with respect to step 110) to create new grouping co-occurrence count matrices for the new grouping of sequences of words. The new grouping co-occurrence count matrices may then be added to the already existing co-occurrence count matrices to thereby update the co-occurrence count matrices. New groupings of sequences of words may be added to the co-occurrence count matrices on one or more of a variety of bases. For example, in some implementations new groupings of sequences of words may be added every hour, every day, every week, as soon as a new groupings are received, as soon as 1,000 new groupings are received, etc.

Also, for example, as certain sequences of words are deleted from a corpus (or are determined to no longer represent timely or pertinent sequences of words) it may be desirable to update the co-occurrence count matrices to reflect the removal of such sequences of words. In some implementations, to update the matrices for each of a plurality of identified bigrams in the removed sequences of words, the number of sequences of words in a corpus in which the bigrams are present for each value of k is determined (e.g., as described, for example, with respect to step 110) to create a new sequence co-occurrence count matrix of the removed sequence of words. The new sequence co-occurrence count matrix may then be subtracted from the already existing co-occurrence count matrix to thereby update the co-occurrence count matrix. Sequences of words may be removed from the co-occurrence count matrix on one or more of a variety of bases. For example, in some implementations sequences of words may be removed when the content with which they are associated is deleted, may be removed on a first-in-first-out basis in which the corpus is set to maintain a fixed amount of the most recent sequences of words, and/or may be removed after being a part of the corpus utilized for more than a certain time period (e.g., more than a day, more than a week, more than two years).

At step 120, the marginal counts for each of the words of the positional bigrams, totals for each of the words of the positional bigrams, and probabilities for each of the positional bigrams are determined. For example, the co-occurrence relationship determination engine 910 may manipulate the co-occurrence count matrices optionally created in step 115 to determine marginal counts for each word for each position k, determine a total count for the words for each matrix of value k, and determine probabilities for each of the positional bigrams of each matrix of value k.

From marginal counts for each word for each value k may be determined by summing the number (either weighted or un-weighted) of times for the positional bigrams determined in step 110 in which the first word of the bigram occurs k positions before any word. For example, if the word "new" occurred one position before the word "york" in 10 sequences of words in a corpus, occurred one position before the word "jersey" in 5 sequences of words in the corpus, and occurred one position before the word "potatoes" in 2 sequences of words in the corpus (and did not occur one position before any other words in the corpus), then the from marginal count for the unweighted count of the word "new" would be 17 (10+5+2). In some implementations the from marginal count for a word for a value k may be determined by summing values in the co-occurrence count matrix for the value k in which the word is the first word in the bigram. In some implementations the from marginal count for a word for a value k may be determined using the following equation:

$$\eta_k(v_\alpha, \bullet) = \sum_{v_\beta \in V} \eta_k(v_\alpha, v_\beta)$$

To marginal counts for each word for each value k may be determined by summing the number (either weighted or un-weighted) of times for the positional bigrams determined in step 110 in which the some word of the bigram occurs k positions before the second word of the bigram. For example, if the word "happy" occurred one position before the word "new" in 15 sequences of words in a corpus and the word "brand" occurred one position before the word "new" in 5 sequences of words in the corpus (and no other words occurred one position before the word new in the corpus), then the to marginal count for the unweighted count of the word "new" would be 20 (15+5). In some implementations the to marginal count for a word for a value k may be determined by summing values in the co-occurrence count matrix for the value k in which the word is the second word in the bigram. In some implementations the from marginal count for a word for a value k may be determined using the following equation:

$$\eta_k(\bullet, v_\beta) = \sum_{v_\alpha \in V} \eta_k(v_\alpha, v_\beta)$$

Total co-occurrence counts for a position k for all of the words may be determined by summing the number (either weighted or un-weighted) of all the various word groupings determined in step 110 in which some word occurs k positions before some word in the corpus. In some implementations the totals may be determined by summing all of the numerical elements in the co-occurrence count matrix for position k. In some implementations the totals may be determined using the following equation:

$$\eta_k(\bullet, \bullet) = \sum_{v_\alpha \in V} \sum_{v_\beta \in V} \eta_k(v_\alpha, v_\beta)$$

The determined marginal counts and totals may be utilized to normalize the co-occurrence count values for each matrix to probabilities. A co-occurrence probability may be determined for each positional bigram for a position k by dividing the co-occurrence count for that positional bigram for the position k by the determined total co-occurrence counts for all word pairs for the position k. For example, in some implementations the co-occurrence probability for a positional bigram for a position k may be determined using the following equation:

$$P_k(v_\alpha, v_\beta) = \frac{\eta_k(v_\alpha, v_\beta)}{\eta_k(\bullet, \bullet)}$$

A from marginal probability for each positional bigram for a position k may be determined by dividing the determined from marginal count for that positional bigram for the position k by the determined total co-occurrence counts for all word pairs for the position k. For example, in some implementations the from marginal probability for a word for a position k may be determined using the following equation:

$$P_k(v_\alpha, \bullet) = \frac{\eta_k(v_\alpha, \bullet)}{\eta_k(\bullet, \bullet)}$$

A to marginal probability for each positional bigram for a position k may be determined by dividing the determined to marginal count for that positional bigram for the position k by the determined total co-occurrence counts for all word pairs for the position k. For example, in some implementations the to marginal probability for a word for a position k may be determined using the following equation:

$$P_k(v_\alpha, \bullet) = \frac{\eta_k(\bullet, v_\beta)}{\eta_k(\bullet, \bullet)}$$

In some implementations smoothed versions of the counts for the to marginal counts, the from marginal counts, and/or the total counts may be utilized. For example, one or more smoothing mechanisms may be utilized to convert raw counts into probabilities such as, for example, Good-Turing smoothing, Kneser-Ney smoothing, and/or Witten-Bell smoothing. In some implementations it may be desirable to utilize a smoothing mechanism when the corpus size is small and marginal counts and/or total counts are too low to provide probability estimates of a desired robustness. In some implementations smoothed to and from marginal probabilities may be calculated utilizing Laplace smoothing and the following equations:

$$P_k(v_\alpha, \bullet) = \frac{\eta_k(v_\alpha, \bullet) + \lambda'}{\eta_k(\bullet, \bullet) + \lambda'|V|}$$

$$P_k(\bullet, v_\beta) = \frac{\eta_k(\bullet, v_\beta) + \lambda'}{\eta_k(\bullet, \bullet) + \lambda'|V|}$$

In some implementations a smoothed co-occurrence probability for a positional bigram for a position k may be determined using the following equation:

$$P_k(v_\alpha, v_\beta) =$$
$$\lambda(\eta_k(v_\alpha, v_\beta), K) \frac{\eta_k(v_\alpha, v_\beta)}{\eta_k(\bullet, \bullet)} + (1 - \lambda(\eta_k(v_\alpha, v_\beta), K))P_k(v_\alpha, \bullet)P_k(\bullet, v_\beta)$$

Where:

$$\lambda(\eta, K) = \frac{\eta}{\eta + K} = \text{Interpoliation factor}$$

At step 125, for each of the positional bigrams it is determined how much more likely than random/incidental it is for the positional bigram to co-occur in a sequence of words. For example, the co-occurrence relationship determination engine 910 may determine how much more likely than random/incidental it is for the positional bigram to co-occur in a sequence of words. In some implementations it is determined for all of the positional bigrams how much more likely than random/incidental it is for the positional bigram to co-occur in a text segment. For example, the co-occurrence probability of a positional bigram for a position k determined in step 120 may be compared to marginal probabilities of words of the positional bigram. If the co-occurrence probability of a positional bigram compared to the to and from marginal probabilities of the positional bigram is relatively high, then it is likely that the words of the positional bigram actually have a positional correlation and are not positionally co-occurring just by random chance. If the co-occurrence probability of a positional bigram compared to the marginal probabilities of the positional bigram is relatively low, then it is likely that many of the positional co-occurrences of the words of the positional bigram are likely due to "incidental chance." For example, two fairly common words may have a relatively high co-occurrence probability for a position k in a corpus due to the popularity of both of the terms. However, it may be unlikely that the two words actually have a strong correlation to one another for the position k. Accordingly, by comparing the co-occurrence probability to the marginal probabilities, it is likely to be determined that many co-occurrences of the positional bigram are likely due to incidental chance and the co-occurrence probability of such word pairs may be altered to create a co-occurrence consistency that downgrades the statistical significance associated with that positional bigram.

The comparison of the co-occurrence probability to the marginal probabilities of the positional bigrams for a value k may be utilized to determine a co-occurrence consistency for each of the positional bigrams for a value k at step 130. For example, a calculation based on the ratio of the co-occurrence probability to the marginal probabilities of the positional bigrams for position k may be the co-occurrence consistency for each of the positional bigrams for position k. In some implementations the co-occurrence consistency for each of the positional bigrams may be determined using the following cosine equation:

$$\phi_k(v_\alpha, v_\beta) = \frac{P_k(v_\alpha, v_\beta)}{\sqrt{P_k(v_\alpha, \bullet)P_k(\bullet, v_\beta)}}$$

In some implementations the co-occurrence consistency for each of the positional bigrams may be determined using the following pointwise mutual information equation:

$$\phi_k(v_\alpha, v_\beta) = \log\left(\frac{P_k(v_\alpha, v_\beta)}{P_k(v_\alpha, \bullet)P_k(\bullet, v_\beta)}\right)$$

In some implementations the co-occurrence consistency for each of the positional bigrams may be determined using the following Jaccard coefficient equation:

$$\phi(v_\alpha, v_\beta) = \frac{P_k(v_\alpha, v_\beta)}{P_k(v_\alpha, \bullet) + P_k(\bullet, v_\beta) - P_k(v_\alpha, v_\beta)}$$

Although specific implementations of equations for determining co-occurrence consistencies are described herein, one of ordinary skill in the art, having had the benefit of the present disclosure, will recognize and appreciate that other determinations of how much more likely than incidental it is for the positional bigram to co-occur in a sequence of words may be utilized. For example, one or more interest equations and/or confidence equations may be utilized.

A plurality of co-occurrence consistency matrices may optionally be formed in step 135 that each identify the co-occurrence consistencies for a plurality of positional bigrams for a single positional value k. For example, the co-occurrence relationship determination engine 910 may form the co-occurrence consistency matrices in step 135. In some implementations the co-occurrence consistency matrices for all co-occurrence consistencies among all the relative positions, k=1, 2, . . . n for all bigrams may be represented by the following equation:

$$\Phi = \{\Phi_k[\emptyset_k(v_\alpha, v_\beta)] : \forall (v_\alpha, v_\beta) \in V\}_{k=1}^n$$

In some implementations, one or more of the co-occurrence consistency matrices created in step 135 may optionally omit certain positional bigrams (completely omit the positional bigrams and/or omit co-occurrence consistency data for certain positional bigrams) to omit those bigrams that are determined to have little correlation to one another in the relative position. For example, in implementations in which co-occurrence consistency matrices are created, at least data associated with those bigrams that have less than a threshold co-occurrence consistency value for a given position may be removed from the relative co-occurrence consistency matrix. In some implementations the threshold co-occurrence consistency value may be a set number. For instance, when a cosine function is utilized to determine the co-occurrence consistency any co-occurrence consistency values below 0.1 may be removed from the co-occurrence consistency matrices. In some implementations the threshold number may be empirically determined. One of ordinary skill in the art, having had the benefit of the present disclosure, will recognize and appreciate that one or more additional and/or alternative bases may optionally be utilized for pruning certain bigrams that occur in a certain position relative to one another with relatively low consistency.

Figure 3:
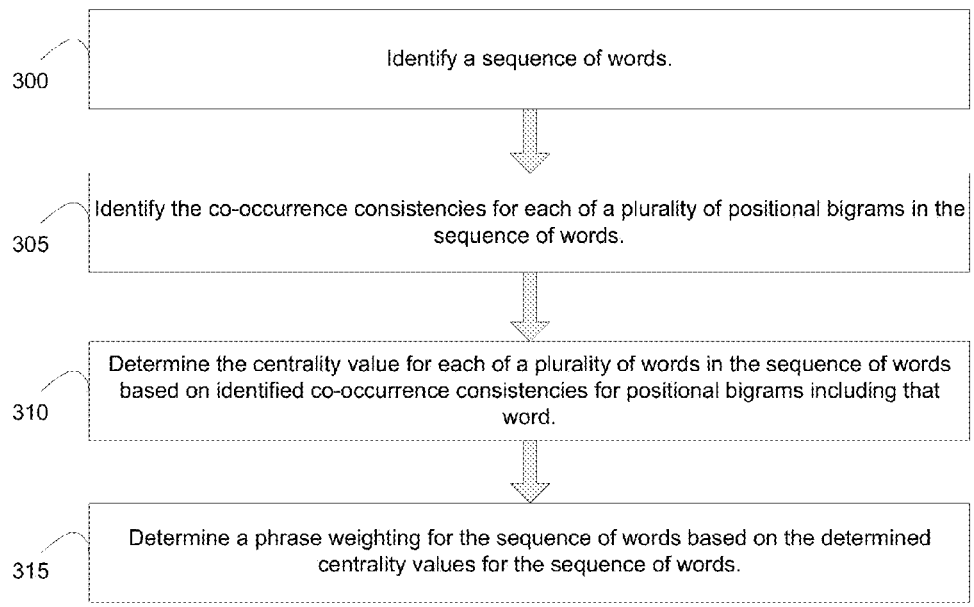
FIG. 3 is a flow chart illustrating an implementation of a method of identifying a phrase weighting of a sequence of words as a function of which words are present in the sequence of words and the position of the words.

Referring to FIG. 3, a flow chart illustrating an implementation of a method of identifying a phrase weighting of a sequence of words as a function of which other words are present in the sequence of words is provided. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may be, for example, the phrase weighting engine 920 of FIG. 9.

At step 300, a sequence of words is identified. In some implementations the phrase weighting engine 920 may identify the sequence of words. The sequence of words may be identified from a supplied listing of words such as words from a document from one or more sources such as content database 915. For example, a headline for a news story from a web page document may be provided and the headline may form the sequence of words. Also, for example, a plurality of words in a document may be provided and one or more sequences of the words of the document may form the sequence of words. For instance, all the words of the document may form a word grouping and a segment parser may parse the words into one or more text segments that each form a sequence of words. Also, for example, the sequence of words may be identified from a submitted search query (e.g., the entire search query or a segment of the search query).

At step 305, the co-occurrence consistencies for each of a plurality of positional bigrams in the sequence of words are identified. In some implementations the phrase weighting engine 320 may identify the co-occurrence consistencies. In some implementations co-occurrence consistencies are identified for all possible positional bigrams of the sequence of words identified in step 300. In some implementations the co-occurrence consistencies may be identified from the co-occurrence consistency matrices created in step 125 of FIG. 1. For example, the co-occurrence consistency matrices may be stored in content database 915 and consulted to obtain co-occurrence consistencies for each of the positional bigrams of the identified sequence of words.

In some implementations one or more co-occurrence consistency matrices for the identified sequence of words may be created based on the co-occurrence consistency matrices created in step 125 of FIG. 1. For instance, given a language model represented by $\Phi = \{\Phi_k[\emptyset_k(v_\alpha, v_\beta)] : \forall (v_\alpha, v_\beta) \in V\}_{k=1}^n$ and a sequence of words that is represented by $x=\{x_1, x_2, \ldots x_n\}$ a sequence consistency matrix may be created as represented by the following equation: $\Phi(x) = [\emptyset_{j-i}(x_i, x_j) : \forall 1 \leq i < j \leq n]$.

Figure 4A:
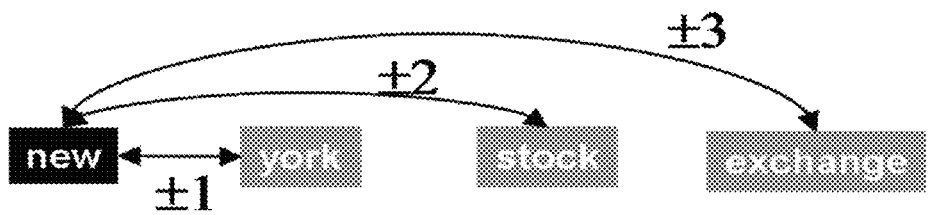
FIG. 4A illustrates the position of "new" relative to other words in the phrase "new york stock exchange."
Figure 4B:
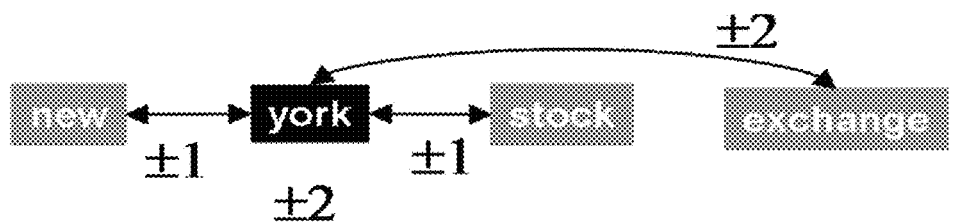
FIG. 4B illustrates the position of "york" relative to other words in the phrase "new york stock exchange."
Figure 4C:
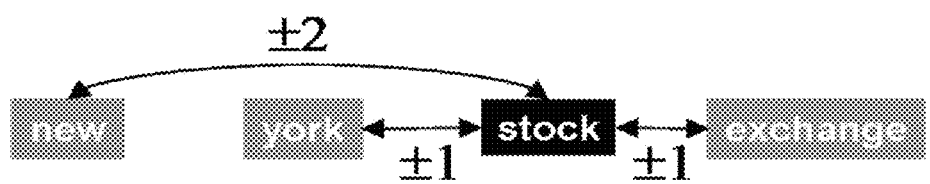
FIG. 4C illustrates the position of "stock" relative to other words in the phrase "new york stock exchange."
Figure 4D:
FIG. 4D illustrates the position of "exchange" relative to other words in the phrase "new york stock exchange."
Figure 5:
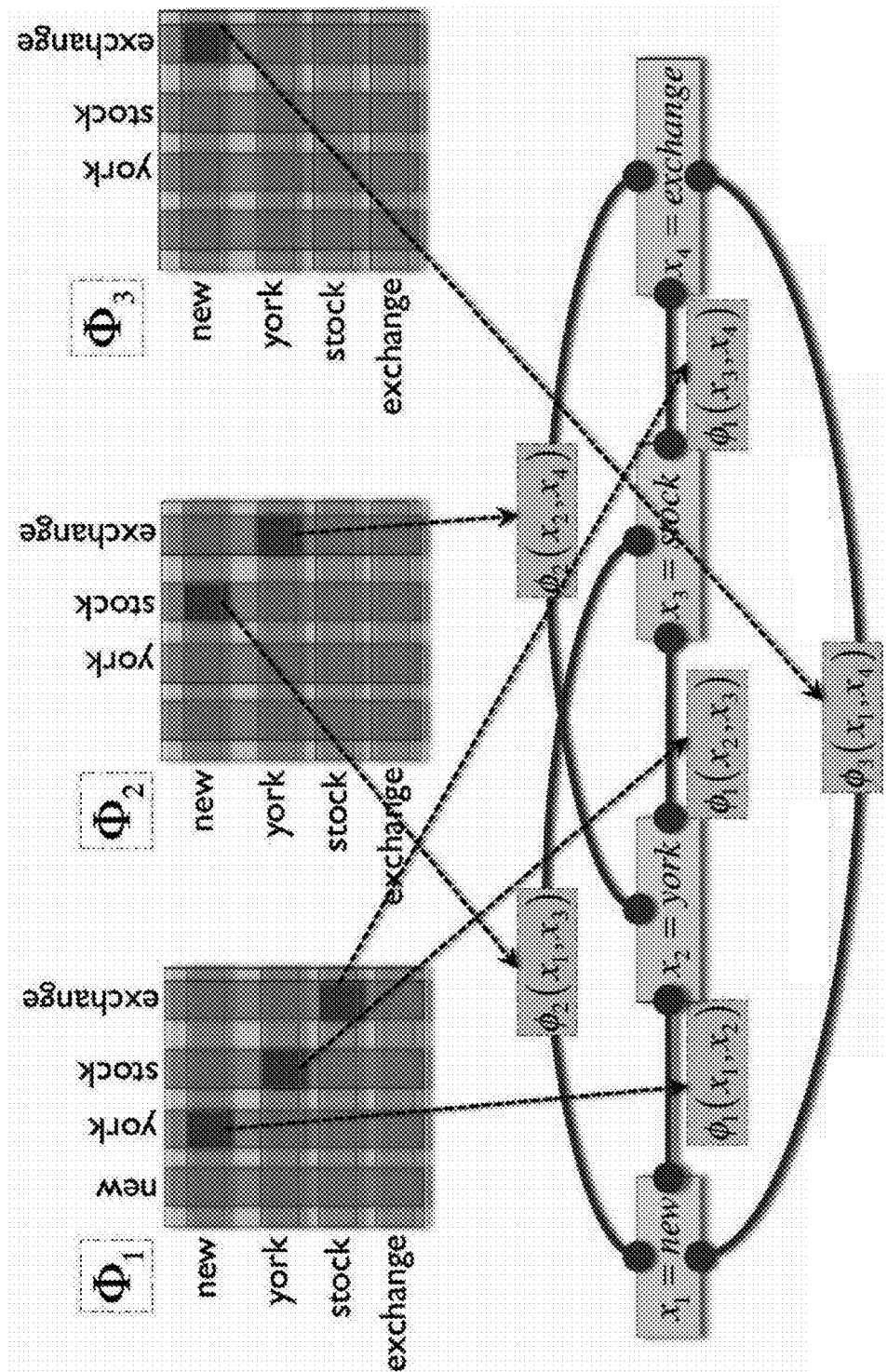
FIG. 5 illustrates an example of positional matrices utilized to determine the co-occurrence consistencies for each of the words of the phrase "new york stock exchange" with other words of the phrase "new york stock exchange."

Referring briefly to FIGS. 4A-5, an example of identifying co-occurrence consistencies for the phrase "new york stock exchange" is provided. FIGS. 4A-4D illustrate the positions between each word of the phrase "new york stock exchange" and other words of the phrase. FIG. 4A illustrates the position of "new" relative to other words in the phrase "new york stock exchange." FIG. 4B illustrates the position of "york" relative to other words in the phrase "new york stock exchange." FIG. 4C illustrates the position of "stock" relative to other words in the phrase "new york stock exchange." FIG. 4D illustrates the position of "exchange" relative to other words in the phrase "new york stock exchange." The illustrated positions represent positional bigrams for which co-occurrence consistencies may be determined. For example, FIG. 4B illustrates that positional bigrams are present for "york" occurring one position after "new"; "york" occurring one position before "stock"; and "york" occurring two positions before "exchange".

Co-occurrence consistencies may be determined for one or more of the positional bigrams of the phrase "new york stock exchange." For example, FIG. 5 illustrates an example of positional matrices utilized to determine the co-occurrence consistencies for each of the words of the phrase "new york stock exchange" with other words of the phrase "new york stock exchange." Co-occurrence consistency values for positional bigrams with words occurring one position apart ($\emptyset_k(x_1, x_2); \emptyset_k(x_2, x_3); \emptyset_k(x_3, x_4)$) are obtained from matrix $\Phi_1$. Co-occurrence consistency values for positional bigrams with words occurring two positions apart ($\emptyset_k(x_1, x_3); \emptyset_k(x_2, x_4)$) are obtained from matrix $\Phi_2$. The co-occurrence consistency value for the positional bigram with words occurring three positions apart ($\emptyset_k(x_1, x_4)$) is obtained from matrix $\Phi_3$.

At step 310, the centrality value for each of a plurality of words in the sequence of words is determined based on identified co-occurrence consistencies for positional bigrams including that word. Generally speaking, a word has a significant centrality value if it co-occurs with other words in the sequence of words in its relative position and if the other words are also have a significant centrality value in the sequence of words.

The importance of a word $x_i$ in a sequence of words x may be represented by $I(x_i | x, \Phi)$, given a sequence of words that is represented by $x=\{x_1, x_2, \ldots x_n\}$.

In some implementations the centrality value of one or more words in a sequence of words may be determined via an iterative auto-associative word importance algorithm. In some implementations the auto-associative based centrality values for the words of a sequence of words may be determined via the following iterative equation that may be updated until convergence:

$$I_{t+1}(x_i \mid \mathbf{x}, \Phi) = \frac{\sum_{\substack{j=1 \\ j \neq i}}^{n} I_t(x_j \mid \mathbf{x}, \Phi) \times \phi_{j-i}(x_i, x_j)}{\sqrt{\sum_{\substack{j=1 \\ j \neq i}}^{n} \phi_{j-i}(x_i, x_j)^2}}$$

where the importance values are represented by $I_t(x_i \mid \mathbf{x}, \Phi) = 1$, $\forall i = 1 \ldots n$.

For example, to determine the centrality value of the word "new" in the sequence of words "new york stock exchange," the following iterative equation may be used:

$$I_{t+1}(\text{new} \mid \text{new york stock exchange}, \Phi) = \frac{\begin{array}{c} I_t(\text{york})\phi_1(\text{new, york}) + I_t(\text{stock})\phi_2(\text{new, stock}) + \\ I_t(\text{exchange})\phi_3(\text{new, exchange}) \end{array}}{\sqrt{\phi_1(\text{new, york})^2 + \phi_2(\text{new, stock})^2 + \phi_3(\text{new, exchange})^2}};$$

to determine the centrality value of the word "york" in the sequence of words "new york stock exchange," the following iterative equation may be used:

$$I_{t+1}(\text{york} \mid \text{new york stock exchange}, \Phi) = \frac{\begin{array}{c} I_t(\text{new})\phi_1(\text{new, york}) + I_t(\text{stock})\phi_1(\text{york, stock}) + \\ I_t(\text{exchange})\phi_2(\text{york, exchange}) \end{array}}{\sqrt{\phi_1(\text{new, york})^2 + \phi_1(\text{york, stock})^2 + \phi_2(\text{york, exchange})^2}};$$

to determine the centrality value of the word "stock" in the sequence of words "new york stock exchange," the following iterative equation may be used:

$$I_{t+1}(\text{stock} \mid \text{new york stock exchange}, \Phi) = \frac{\begin{array}{c} I_t(\text{new})\phi_2(\text{new, stock}) + I_t(\text{york})\phi_1(\text{york, stock}) + \\ I_t(\text{exchange})\phi_1(\text{stock, exchange}) \end{array}}{\sqrt{\phi_2(\text{new, stock})^2 + \phi_1(\text{york, stock})^2 + \phi_1(\text{stock, exchange})^2}};$$

and to determine the centrality value of the word "exchange" in the sequence of words "new york stock exchange," the following iterative equation may be used:

$$I_{t+1}(\text{exchange} \mid \text{new york stock exchange}, \Phi) = \frac{\begin{array}{c} I_t(\text{new})\phi_3(\text{new, exchange}) + \\ I_t(\text{york})\phi_2(\text{york, exchange}) + I_t(\text{stock})\phi_1(\text{stock, exchange}) \end{array}}{\sqrt{\phi_3(\text{new, exchange})^2 + \phi_2(\text{york, exchange})^2 +}}.$$

In some implementations the centrality value of one or more words in a sequence of words may be determined via a link analysis algorithm. In some implementations the link analysis algorithm may be an algorithm such as a PageRank algorithm. For example, the link analysis algorithm may assign a numerical weighting to each word of a sequence of words based on the links between that word and other words of the sequence of words. In some implementations the link analysis based centrality values for the words of a word sequence may be determined via the following iterative equation that may be updated until convergence:

$$I_{t+1}(x_i \mid \mathbf{x}, \Phi) = (1 - \lambda) I_0(x_i \mid \mathbf{x}, \Phi) + \lambda \frac{\sum_{\substack{j=1 \\ j \neq i}}^{n} I_t(x_j \mid \mathbf{x}, \Phi) \times \phi_{j-i}(x_i, x_j)}{\sqrt{\sum_{\substack{j=1 \\ j \neq i}}^{n} \phi_{j-i}(x_i, x_j)}}$$

where the importance values are represented by $$I_0(x_i \mid \mathbf{x}, \Phi) = \frac{1}{n}, \forall i = 1 \ldots n.$$

In some implementations the centrality value of one or more words in a sequence of words may be determined via a HITS based algorithm. In some implementations the HITS analysis based centrality values for the words of a word sequence may be determined via the following iterative equations that may be updated until convergence:

$$h_{t+1}(x_i) \leftarrow \sum_{\substack{j=1 \\ j \neq i}}^{n} a_t(x_j) \times \phi_{j-i}(x_i, x_j) \Big/ \sqrt{\sum_{\substack{j=1 \\ j \neq i}}^{n} a_t(x_j)^2}$$

$$a_{t+1}(x_i) \leftarrow \sum_{\substack{j=1 \\ j \neq i}}^{n} h_{t+1}(x_j) \times \phi_{j-i}(x_i, x_j) \Big/ \sqrt{\sum_{\substack{j=1 \\ j \neq i}}^{n} h_{t+1}(x_j)^2}$$

where the authority weights are represented by $a_t(x_i) \leftarrow 1$, $\forall i = 1 \ldots n$; where the importance values are represented by $I(x_i \mid \mathbf{x}, \Phi) = a_\infty(x_i)$; and where the hub weights are updated from the authority weights and the authority weights are updated from the hub weights.

At step 315 a phrase weighting is determined for the sequence of words based on the determined centrality values for the sequence of words. The phrase weighting provides an indication of the likelihood that the sequence of words is a phrase. In some implementations the centrality values of all words in the sequence of words may be combined to determine the phrase weighting of the sequence of words. For example, in some implementations the phrase weighting of the sequence of words may be represented by the equation $\pi(x) = \pi(x_1, \ldots x_n) = f(\Phi(x) = [\phi_{j-i}(x_i, x_j)]$ In some implementations the phrase weighting of the sequence of words may be determined by determining a Gibb's weighted average of the centrality values for the sequence of words. For example, in some implementations the phrase weighting of the sequence of words may be determined via the equation:

$$\pi(x) = \frac{\sum_{i=1}^{n} I(x_i \mid \mathbf{x}, \Phi) \exp(-\lambda I(x_i \mid \mathbf{x}, \Phi))}{\sum_{i=1}^{n} \exp(-\lambda I(x_i \mid \mathbf{x}, \Phi))}$$

In some implementations the phrase weighting of the sequence of words may be based on the minimum centrality value of the centrality values for the sequence of words. For example, in some implementations the phrase weighting of the sequence of words may be determined via the equation:

$$\pi(x) = \min\{I(x_i \mid x, \Phi)\}$$

wherein the phrase weighting will be based on the minimum centrality value of the centrality values for the sequence of words. For example, in some implementations if any of the centrality values of the sequence of words is below a minimum threshold centrality value, then the phrase will be assigned a low phrase weighting in implementations where higher phrase weightings indicate greater likelihood of a phrase. For instance, for the phrase "new jersey stock exchange" the phrase weighting may be assigned a low phrase weighting due to a low centrality value of "jersey" even though an average based determination taking into account the centrality values of the other words "new, stock, exchange" may result in a relatively high phrase weighting.

One of ordinary skill in the art, having had the benefit of the present disclosure, will recognize and appreciate that additional and/or alternative methods may optionally be utilized in determining a phrase weighting for a sequence of words. For example, other average calculations may be utilized as an alternative to the Gibb's weighted average calculation. Also, for example, the centrality values of a sequence of words may first be analyzed to determine if any word has a centrality value that is below a minimum threshold centrality value, and, if it is determined that all centrality values are above the threshold centrality value, then an average of the centrality values may be taken to determine a phrase weighting.

In some implementations the determination of phrase weighting for a sequence of words may optionally be performed in "offline" applications such as, for example, crawling of documents, web pages, or other groupings of words. In some implementations the determination of phrase weighting for a sequence of words may optionally be performed in real time application such as, for example, analysis of a submitted query (e.g., to determine phrase weighting of one or more text segments of the query). In some implementations the sequence of words may be indexed as a phrase when the phrase weighting of the sequence of words is greater than a threshold phrase weighting. For example, the sequence of words may be stored as an identified phrase in content database 915 or elsewhere when the phrase weighting indicates a high likelihood that the sequence of words is a phrase. A stored identified phrase may optionally be utilized in one or more text mining applications such as those discussed herein.

Figure 6:
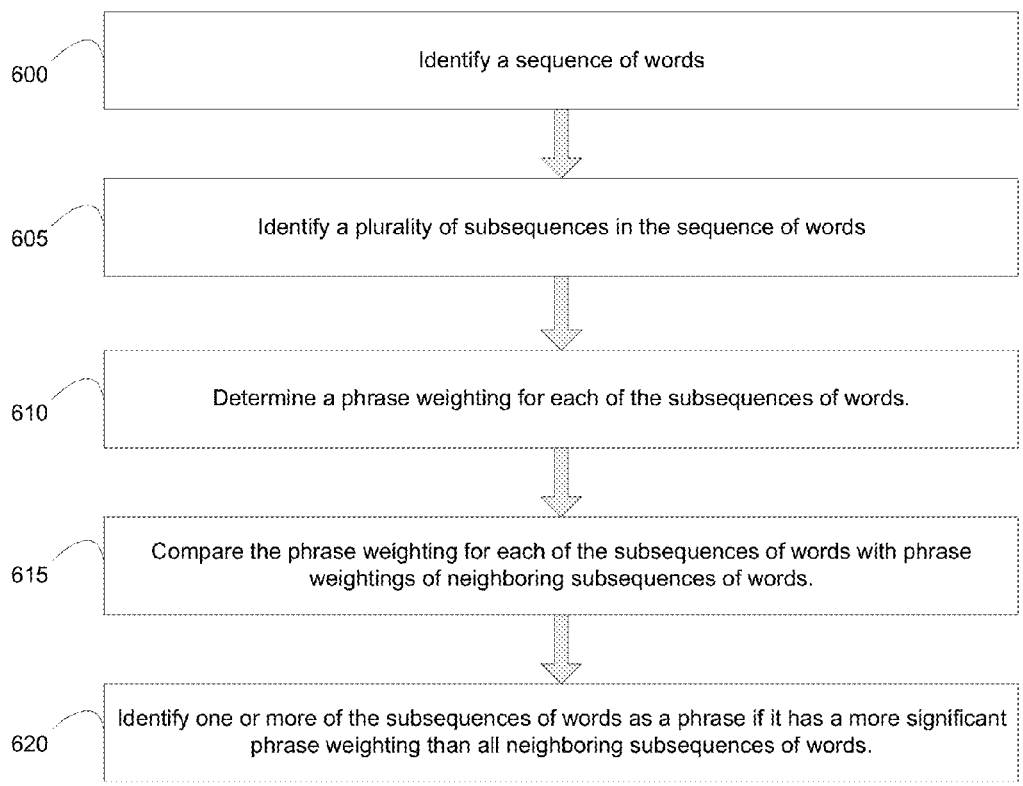
FIG. 6 is a flow chart illustrating an implementation of a method of identifying one or more phrase boundaries in a sequence of words.

Referring to FIG. 6, a flow chart illustrating an implementation of a method of identifying one or more phrase boundaries in a sequence of words is provided. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may be, for example, the phrase segmentation engine 925 of FIG. 9.

At step 600, a sequence of words is identified. In some implementations the phrase segmentation engine 925 may identify the sequence of words. The sequence of words may be identified from a supplied listing of words such as words from a document from one or more sources such as content database 915. For example, a headline for a news story from a web page document may be provided and the headline may form the sequence of words. Also, for example, a plurality of words in a document may be provided and one or more sequences of the words of the document may form the sequence of words. For instance, all the words of the document may form a word grouping and a segment parser may parse the words into one or more text segments that each form a sequence of words. Also, for example, the sequence of words may be identified from a submitted search query (e.g., the entire search query or a segment of the search query). In some implementations the sequence of words may be a text segment. In some implementations steps 300 and/or 600 may share one or more common aspects.

Figure 7:
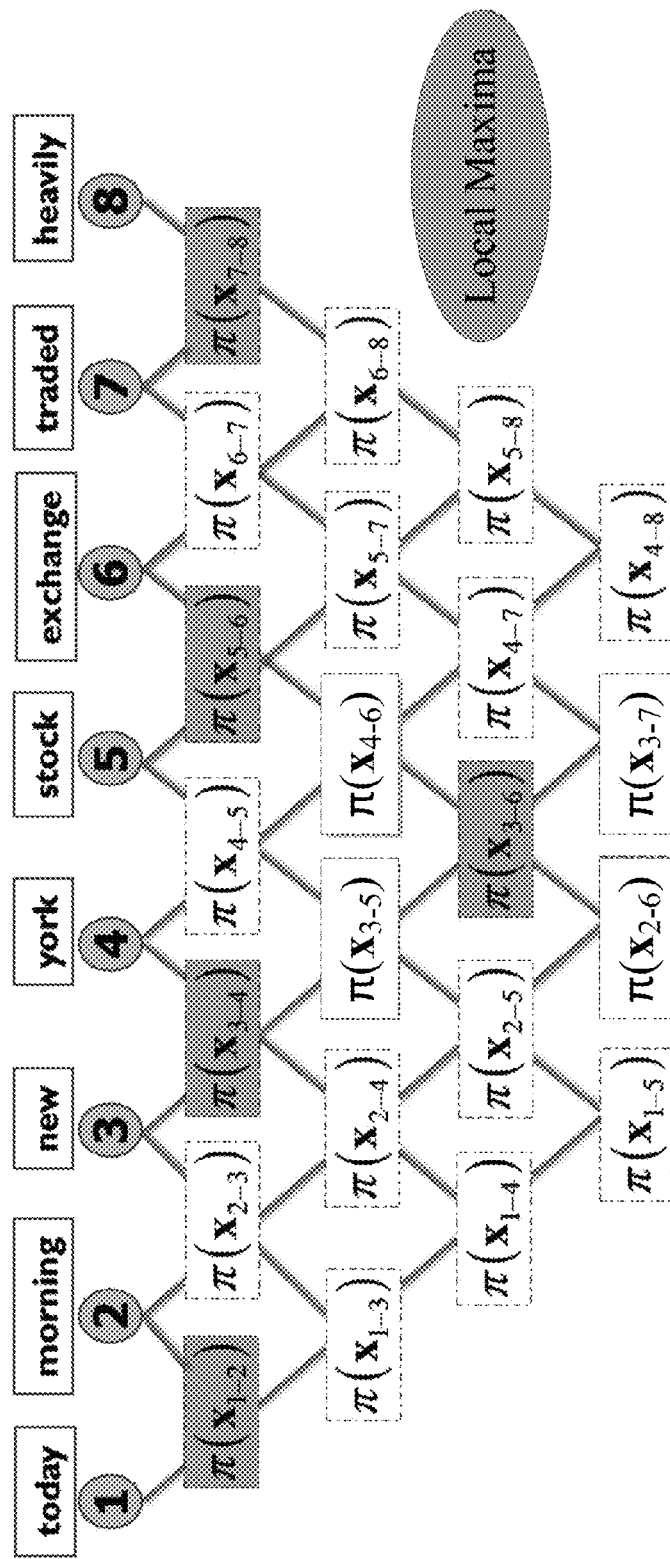
FIG. 7 illustrates an example of a lattice structure of phrase weighting formulas for a plurality of subsequences in a sequence of words that graphically illustrates an example of identifying one or more phrase boundaries in a sequence of words.
Figure 8:
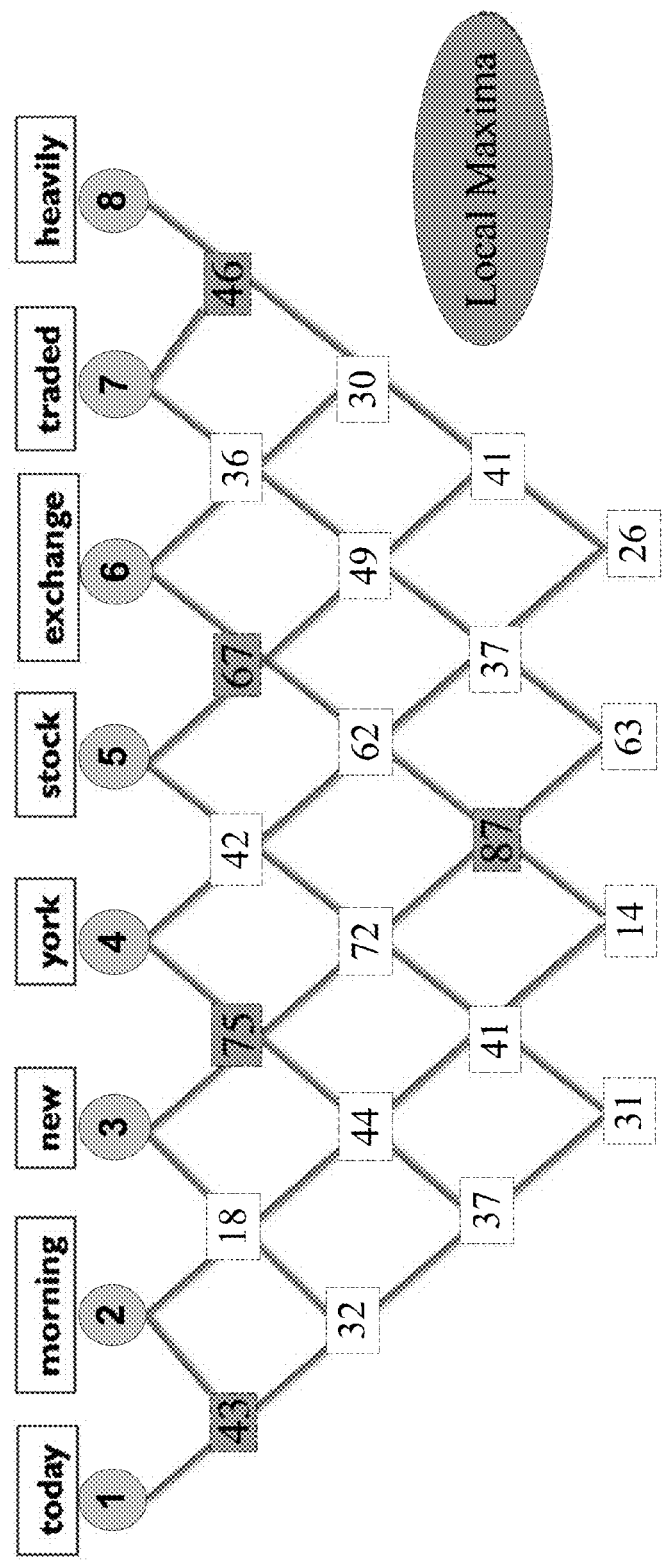
FIG. 8 illustrates an example of a lattice structure of actual phrase weighting values for a plurality of subsequences in a sequence of words that graphically illustrates an example of identifying one or more phrase boundaries in a sequence of words.

At step 605, a plurality of subsequences in the sequence of words are identified. In some implementations the phrase segmentation engine 925 may identify the subsequences of words. In some implementations the plurality of subsequences may include all potential groupings of two or more sequentially arranged words in the sequence of words. In some implementations the plurality of subsequences may include all potential groupings of two or more sequentially arranged words in the sequence of words up to a value k. For example, as illustrated in FIGS. 7 and 8, twenty-two separate subsequences are identified for the sequence of words "today morning new york stock exchange traded heavily," representing all potential groupings of two or more sequentially arranged words in the sequence up to a value of five. Each subsequence is represented by a node in the lattice structure of FIGS. 7 and 8. For example, each node in FIG. 7 is illustrated by nodes labeled with $\pi(x_{i-j})$, wherein i represents the numerical value of the starting word of the subsequence, j represents the numerical value of the ending word of the subsequence, and $\pi(x_{i-j})$ represents the phrase weighting formula of the subsequence. For example, $\pi(x_{3-6})$ represents the phrase weighting formula of the four word subsequence "new york stock exchange". Also, for example, each node in FIG. 8 is illustrated by nodes labeled with a numerical value that is indicative of an example phrase weighting of the corresponding subsequence of words. For example, numerical value "72" represents the example phrase weighting of the five word subsequence "new york stock exchange traded".

At step 610 a phrase weighting is determined for each of the identified subsequences of words. In some implementations the phrase weighting may be provided in combination with the subsequences of words. In some implementations the phrase weightings may be obtained from a database such as content database 915. For example, the phrase segmentation engine 925 may query the content database 915 to obtain the various phrase weightings for the plurality of subsequences of words. In some implementations the phrase weighting engine 920 may determine the phrase weighting for the identified subsequences of words. For example, in some implementations the phrase weighting engine 920 may perform one or more of the steps of FIG. 3 to determine the phrase weightings for the identified subsequences of words.

At step 615 the phrase weighting for each of the subsequences of words is compared with phrase weightings of neighboring subsequences of words. For example, the phrase weighting of each node in the lattice structure of FIGS. 7 and 8 is compared with neighboring nodes. Neighboring subsequences of words of a given subsequence of words are those that either add or subtract a single word from the left or right of the given subsequence of words. For example, the neighbors of "york stock exchange" in FIGS. 7 and 8 are "york stock"; "stock exchange;" "new york stock exchange;" and "york stock exchange traded." Also, for example, the neighbors of "morning new" in FIGS. 7 and 8 are "today morning new" and "morning new york."

At step 620 one or more of the subsequences of words is identified as a phrase if it has a more significant phrase weighting than all neighboring subsequences of words. In some implementations when a phrase is identified as a phrase in step 620 it may be added to a phrase lexicon database such as content database 915, optionally in combination with its phrase weighting. In some implementations where a larger phrase weighting has a greater significance, it may be determined which subsequences have a greater value than all of its neighbors via the comparison in step 615. For example, as illustrated in the example of FIGS. 7 and 8, local maxima are identified for the subsequences of "today morning"; "new york"; "stock exchange"; "traded heavily"; and "new york stock exchange" since the phrase weightings of those subsequences of words (FIG. 8) are greater than the phrase weightings of all of their respective immediate neighbors. Each of the subsequences of words that have phrase weightings greater than the phrase weightings of all of their respective immediate neighbors represents a local maxima. In some implementations each local maxima may be identified as a phrase. The overall maxima with the largest phrase weighting from all the subsequences of words may also be determined. For example, in the example of FIGS. 7 and 8, the subsequence "new york stock exchange" is the overall maxima from the sequence of words.

In some implementations given a sequence represented by $(x_1, \ldots, x_n)$, its subsequence $x_{i-j}=(x_i, \ldots, x_j)$ may be identified as a phrase if its phrase weighting is greater than the phrase weighting of all of its neighbors, as represented by the equations:

$$\pi(x_i, \ldots, x_j) \geq \begin{cases} \pi(x_{i+1}, \ldots, x_j) & \text{Left Shrink} \\ \pi(x_i, \ldots, x_{j-1}) & \text{Right Shrink} \\ \pi(x_{i-1}, \ldots, x_j) & \text{Left Grow} \\ \pi(x_i, \ldots, x_{j+1}) & \text{Right Grow} \end{cases}$$

FIG. 9 illustrates a block diagram of an example environment in which co-occurrence consistencies for positional word pairings in a sequence of words may be determined, phrase coherence of a sequence of words may be determined as a function of positional word pairings in the sequence of words, and/or one or more phrase boundaries in a sequence of words may be determined. The environment includes a communication network 901 that allows for communication between various components of the environment. The communication network 901 facilitates communication between the various components in the environment. In some implementations the communication network may include the Internet, one or more intranets, and/or one or more bus subsystems. The communication network 901 may optionally utilize one or more standard communications technologies, protocols, and/or inter-process communication techniques.

The co-occurrence relationship determination engine 910 may access a corpus of sequences of words from content database 915 or elsewhere and utilize such corpus to determine co-occurrence consistencies for positional word pairings utilizing techniques as described herein. In some implementations the co-occurrence relationship determination engine 910 may perform one or more of the steps of the method of FIG. 1. The co-occurrence relationship engine 910 may be implemented in hardware, firmware, and/or software running on hardware. For example, the co-occurrence relationship engine 910 may be implemented in one or more computer servers.

The phrase weighting engine 920 may access a sequence of words from content database 915 or elsewhere (e.g., from a user submitted query via the Internet) and analyze such sequence of words to contextually weight words in the sequence of words utilizing techniques as described herein. The phrase weighting engine 920 may perform one or more of the steps of the method of FIG. 3. The phrase weighting engine 920 may be implemented in hardware, firmware, and/or software running on hardware. For example, the phrase weighting engine 920 may be implemented in one or more computer servers. The phrase weighting engine 920 utilizes one or more identified co-occurrence consistencies to determine a phrase weighting of a sequence of words. In some implementations the co-occurrence consistencies may be obtained, either directly or indirectly (e.g., via content database 915) via the co-occurrence relationship determination engine 910.

The phrase segmentation engine 925 may access a sequences of words from content database 915 or elsewhere and identify one or more phrase boundaries in the sequence of words utilizing techniques as described herein. In some implementations the phrase segmentation engine 925 may perform one or more of the steps of the method of FIG. 6. The phrase segmentation engine 925 may be implemented in hardware, firmware, and/or software running on hardware. For example, the phrase segmentation engine 925 may be implemented in one or more computer servers.

The text mining application 905 may utilize the phrase weightings of sequences of words and/or the identification of phrases from sequences of words for one or more applications such as, for example, text classification, text clustering, information retrieval, and/or key phrase detection. For example, in some implementations the text mining application 905 may include a search engine. The phrase weighting engine 920 may determine the phrase weighting of all or portions of a submitted search query and/or the phrase segmentation engine 925 may identify phrases from the submitted search query. Identified phrases from the submitted search query may be utilized in formulating a more accurate search request. For example, one or more identified phrases in a submitted search query may be submitted in a search request to be searched as a cohesive sequence. The phrase weighting engine 920 and/or the phrase segmentation engine 925 may additionally or alternatively crawl web pages to determine phrases and/or phrase weightings in the webpages and thereby provide more meaningful results to a query submitted to the search engine. For example, identified phrases from web pages may be utilized to promote certain web pages in search results that contain a phrase from a search query over certain results that contain words of the phrase, but do not have those words in their respective relative positions in the phrase.

Also, for example, in some implementations the text mining application 905 may include a document clustering and classification engine. One or more phrases in a document may be identified via the phrase weighting engine 920 (e.g., determining the phrase weightings of potential phrases) and/or the phrase segmentation engine 925 (e.g., identifying phrases within the document). Such identified phrases may be utilized by the document clustering and classification engine to analyze phrase level similarity between documents in addition to or as an alternative to analyzing word level similarity between the documents.

Also, for example, in some implementations the text mining application 905 may include an indexing engine. One or more phrases in a document may be identified via phrase weighting engine 920 and/or the phrase segmentation engine 925. Identified phrases may be utilized by the indexing engine to index documents based on phrases within the documents.

Also, for example, in some implementations the text mining application 905 may include a machine translation engine. One or more phrases in a first language may be identified via the phrase weighting engine 920 and/or the phrase segmentation engine 925. Identified phrases in the first language may then be converted to corresponding phrases in a second language. The text mining application 905 may be implemented in hardware, firmware, and/or software running on hardware. For example, the text mining application 905 may be implemented in one or more computer servers.

Many other configurations are possible having more or less components than the environment shown in FIG. 9. For example, although the co-occurrence relationship determination engine 910, the phrase weighting engine 920, and the phrase segmentation engine 925 are all illustrated in FIG. 9, it is understood that in some environments less than all of the co-occurrence relationship determination engine 910, the phrase weighting engine 920, and the phrase segmentation engine 925 may be provided. Also, for example, in some environments the text mining application 905 may be omitted. Also, for example, in some environments one or more of the co-occurrence relationship determination engine 910, the phrase weighting engine 920, and the phrase segmentation engine 925 may be combined.

Figure 10:
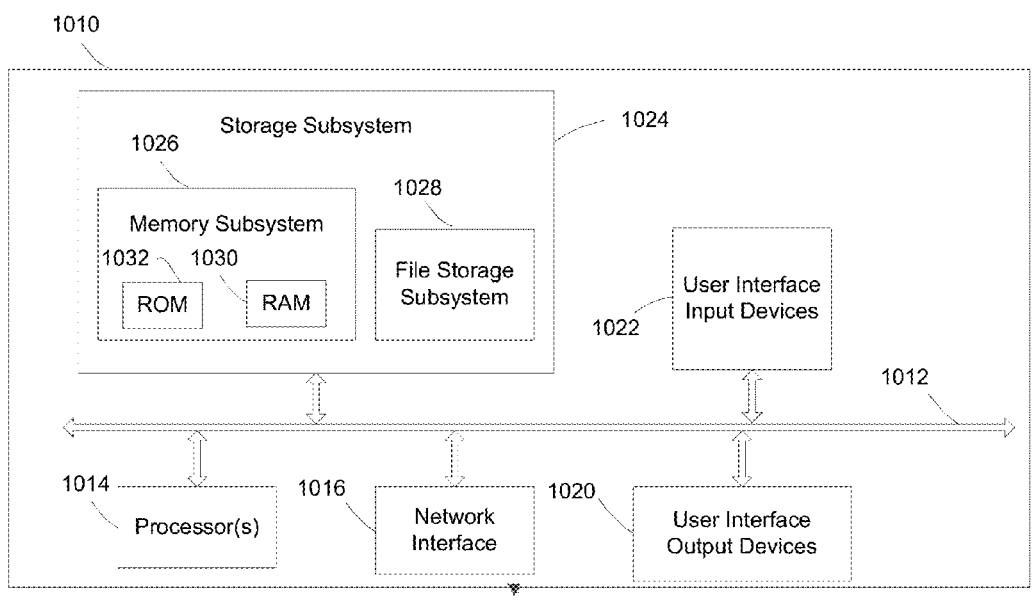
FIG. 10 illustrates a block diagram of an example computer system.

FIG. 10 is a block diagram of an example computer system 1010. Computer system 1010 typically includes at least one processor 1014 which communicates with a number of peripheral devices via bus subsystem 1012. These peripheral devices may include a storage subsystem 1024, including, for example, a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks and is coupled to corresponding interface devices in other computer systems.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules described herein. For example, the storage subsystem 1024 may include the logic to determine co-occurrence consistencies for positional word pairings of a plurality of sequences of words, to determine a phrase coherence of a sequence of words based on the co-occurrence consistencies for positional word pairings in the sequence of words, and/or to one or more phrase boundaries in a sequence of words according to one or more processes described herein.

These software modules are generally executed by processor 1014 alone or in combination with other processors. Memory 1026 used in the storage subsystem can include a number of memories including a main random access memory (RAM) 1030 for storage of instructions and data during program execution and a read only memory (ROM) 1032 in which fixed instructions are stored. A file storage subsystem 1028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1028 in the storage subsystem 1024, or in other machines accessible by the processor(s) 1014.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as a specific example for purposes of illustrating some implementations. Many other configurations of computer system 1010 are possible having more or fewer components than the computer system depicted in FIG. 10.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method of identifying a phrase weighting of a sequence of words as a function of the position of words present in the sequence of words, comprising:
   identifying a sequence of words;
   determining, utilizing one or more processors, a centrality value for each of a plurality of identified words in the sequence of words, the centrality value for each of the identified words based on a co-occurrence consistency with other of the identified words in their respective relative positions in the sequence of words; and
   determining, utilizing one or more processors, a phrase weighting of the sequence of words based on the determined centrality value for each of the identified words, wherein the phrase weighting provides an indication of the likelihood that the sequence of words is a phrase.

2. The method of claim 1, wherein the step of determining the phrase weighting of the sequence of words includes combining the centrality value for each of the identified words.

3. The method of claim 2, wherein the step of determining the phrase weighting of the sequence of words includes determining a weighted average of the centrality value for each of the identified words.

4. The method of claim 2, wherein the step of determining the phrase weighting of the sequence of words includes determining a minimum centrality value from the centrality value for each of the identified words.

5. The method of claim 1, further comprising identifying the sequence of words for indexing as a phrase when the phrase weighting is greater than a threshold phrase weighting.

6. The method of claim 1, wherein the step of determining a centrality value for each of the identified words includes performing an auto-associative analysis for each of the identified words with all other of the identified words in their respective relative positions in the sequence of words.

7. The method of claim 1, wherein the step of determining a centrality value for each of the identified words includes performing a link analysis for each of the identified words with all other of the identified words in their respective relative positions in the sequence of words.

8. The method of claim 1, wherein the co-occurrence consistency for each of the identified words with other of the identified words in their respective relative positions in the sequence of words is extracted from a plurality of positional matrices, each of the positional matrices containing co-occurrence consistency values for a plurality of word pairs in a given positional relation to one another.

9. The method of claim 1, wherein the co-occurrence consistency for each of the identified words with other of the identified words in their respective relative positions in the sequence of words factors in how much more likely than incidental it is for each of the identified words to co-occur with other identified words in their respective relative positions.

10. The method of claim 1, further comprising parsing a document to create the sequence of words.

11. The method of claim 1, further comprising receiving a search query and identifying the sequence of words from the search query.

12. The method of claim 1, wherein the sequence of words is part of a larger sequence of words and further comprising:
   identifying a second sequence of words from the larger sequence of words, wherein the second sequence of words contains the same words as the identified words and one additional word;
   determining, utilizing one or more processors, an additional centrality value for the additional word, the additional centrality value based on the co-occurrence consistency of the additional word with other of the identified words in their respective relative positions in the second sequence of words; and
   determining, utilizing one or more processors, a second phrase weighting of the second sequence of words based on the determined additional centrality value, wherein the second phrase weighting provides an indication of the likelihood that the second sequence of words is a phrase; and
   comparing the phrase weighting to the second phrase weighting to identify which is more likely to be a phrase.

13. The method of claim 1, wherein the sequence of words is part of a larger sequence of words and further comprising:
   identifying additional sequences of words from the larger sequence of words; and
   determining, utilizing one or more processors, additional phrase weightings of each of the additional sequences of words that provide an indication of phrase likelihood.

14. The method of claim 13, further comprising comparing a plurality of the additional phrase weightings and the phrase weighting to one another to identify at least one phrase in the larger sequence of words.

15. The method of claim 14, wherein the comparing includes identifying at least one local extrema among the additional phrase weightings and the phrase weighting.

16. A system, comprising:
   memory storing instructions; and
   one or more processors operable to execute the instructions stored in the memory;
   wherein the instructions comprise instructions to:
   identify a sequence of words;
   determine a centrality value for each of a plurality of identified words in the sequence of words, the centrality value for each of the identified words based on a co-occurrence consistency with other of the identified words in their respective relative positions in the sequence of words; and
   determine a phrase weighting of the sequence of words based on the determined centrality value for each of the identified words, wherein the phrase weighting provides an indication of the likelihood that the sequence of words is a phrase.

17. The system of claim 16, wherein the instructions to determine the phrase weighting of the sequence of words include instructions to combine the centrality value for each of the identified words.

18. The system of claim 17, wherein the instructions to determine the phrase weighting of the sequence of words include instructions to determine a weighted average of the centrality value for each of the identified words.

19. The system of claim 16, wherein the instructions to determine a centrality value for each of the identified words include instructions to perform an auto-associative analysis for each of the identified words with all other of the identified words in their respective relative positions in the sequence of words.

20. The system of claim 16, wherein the co-occurrence consistency for each of the identified words with other of the identified words in their respective relative positions in the sequence of words is extracted from a plurality of positional matrices, each of said positional matrices containing co-occurrence consistency values for a plurality of word pairs in a given positional relation to one another.

21. The system of claim 16, wherein the co-occurrence consistency for each of the identified words with other of the identified words in their respective relative positions in the sequence of words factors in how much more likely than incidental it is for each of the identified words to co-occur with other identified words in their respective relative positions.

22. The system of claim 16, wherein the sequence of words is part of a larger sequence of words and further including instructions to:
   identify additional sequences of words from the larger sequence of words; and
   determine, utilizing one or more processors, additional phrase weightings of each of the additional sequences of words that provide an indication of phrase likelihood.

23. The system of claim 16, further comprising instructions to compare a plurality of the additional phrase weightings and the phrase weighting to one another to identify at least one phrase in the larger sequence of words.

24. The system of claim 23, wherein the instructions to compare a plurality of the additional phrase weightings and the phrase one another to identify at least one phrase in the larger sequence of words include instructions to identify at least one local extrema among the additional phrase weightings and the phrase weighting.

25. A non-transitory computer readable storage medium storing computer instructions executable by a processor to perform a method comprising:
   identifying a sequence of words;
   determining, utilizing one or more processors, a centrality value for each of a plurality of identified words in the sequence of words, the centrality value for each of the identified words based on a co-occurrence consistency with other of the identified words in their respective relative positions in the sequence of words; and
   determining, utilizing one or more processors, a phrase weighting of the sequence of words based on the determined centrality value for each of the identified words, wherein the phrase weighting provides an indication of the likelihood that the sequence of words is a phrase.

* * * * *